US006656087B1

United States Patent
Runde et al.

(10) Patent No.: US 6,656,087 B1
(45) Date of Patent: Dec. 2, 2003

(54) MULTI-STAGE SKIP DOWNSHIFT CONTROL FOR AN AUTOMATIC TRANSMISSION

(75) Inventors: Jeffrey Kurt Runde, Fishers, IN (US); Scott Thomas Kluemper, Monrovia, IN (US); Scott E. Mundy, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/167,060

(22) Filed: Jun. 11, 2002

(51) Int. Cl.[7] ............................................... B60K 41/04
(52) U.S. Cl. ...................................................... 477/107
(58) Field of Search ......................................... 477/107

(56) References Cited

U.S. PATENT DOCUMENTS

| 4,796,490 A | * | 1/1989 | Butts et al. | 477/107 |
| 5,038,636 A | | 8/1991 | Vukovich et al. | 74/866 |
| 5,079,970 A | * | 1/1992 | Butts et al. | 477/107 |
| 5,113,343 A | | 5/1992 | Hunter et al. | 364/424.1 |
| 5,601,506 A | | 2/1997 | Long et al. | 475/120 |
| 6,319,170 B1 | | 11/2001 | Hubbard et al. | 477/107 |

* cited by examiner

Primary Examiner—Dirk Wright
(74) Attorney, Agent, or Firm—Leslie C. Hodges

(57) ABSTRACT

An improved downshift control for an automatic transmission optimized for sequential shifting achieves skip-downshifting to a target gear by shifting the transmission to neutral and controlling the engine output torque while the transmission is reconfigured to establish the target speed ratio. The engine torque control is designed to allow the transmission input speed to reach the synchronization speed for the target speed ratio at a desired time, and the shift is completed when the transmission input speed actually reaches the synchronization speed. The engine torque control is predicated on a modeled engine torque parameter, and the torque control includes an adaptive parameter for adaptively adjusting the torque control to ensure that the input speed reaches the synchronization speed at the desired time.

15 Claims, 4 Drawing Sheets

MULTI-STAGE SKIP DOWNSHIFT CONTROL FOR AN AUTOMATIC TRANSMISSION

TECHNICAL FIELD

This invention relates to the control of skipped-ratio power-on downshifting in an automatic transmission that is optimized for sequential ratio shifting.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset. Shifting from a currently established speed ratio to a numerically adjacent speed ratio involves, in most cases, disengaging a clutch (off-going clutch) associated with the current speed ratio and engaging a clutch (on-coming clutch) associated with the new speed ratio.

Since most shifts involve numerically adjacent speed ratios (i.e., sequential shifting), the fluid control hardware can be designed to minimize the number of modulated pressure control valves, as disclosed for example, in the U.S. Pat. No. 5,601,506 to Long et al., issued on Feb. 11, 1997, and assigned to the assignee of the present invention. In Long et al., a set of relatively inexpensive on/off relay valves selectively couple the various transmission clutches to two modulated valves, such that a certain combination of clutches can only be coupled to a given modulated valve, and for any shift to a numerically adjacent speed ratio, one of the modulated valves is coupled to the on-coming clutch, and the other modulated valve is coupled to the off-going clutch. While such an arrangement can significantly simplify the control hardware and reduce manufacturing costs, it essentially rules out skip-shifting—that is, shifting to speed ratio other than a numerically adjacent speed ratio. Thus, if the transmission is operating in third gear, for example, and the engine load abruptly increases to a level for which first gear would be appropriate, the controller must successively perform sequential shifts from third-to-second, and from second-to-first, instead of skip-shifting from third-to-first. Accordingly, what is needed is a control methodology for performing skip-downshifts in a transmission where the control valve configuration is optimized for sequential shifting.

SUMMARY OF THE INVENTION

The present invention is directed to an improved downshift control for an automatic transmission optimized for sequential shifting, wherein skip-downshifting to a target gear is achieved by shifting the transmission to neutral and controlling the engine output torque while the transmission is reconfigured to establish the target speed ratio. The engine torque control is designed to allow the transmission input speed to reach the synchronization speed for the target speed ratio at a desired time, and the shift is completed when the transmission input speed actually reaches the synchronization speed. The engine torque control is predicated on a modeled engine torque parameter, and the torque control includes an adaptive parameter for adaptively adjusting the torque control to ensure that the input speed reaches the synchronization speed at the desired time.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further detail regarding the fluid pressure routings and so forth may be found in the aforementioned patents.

Figures 1, 2:
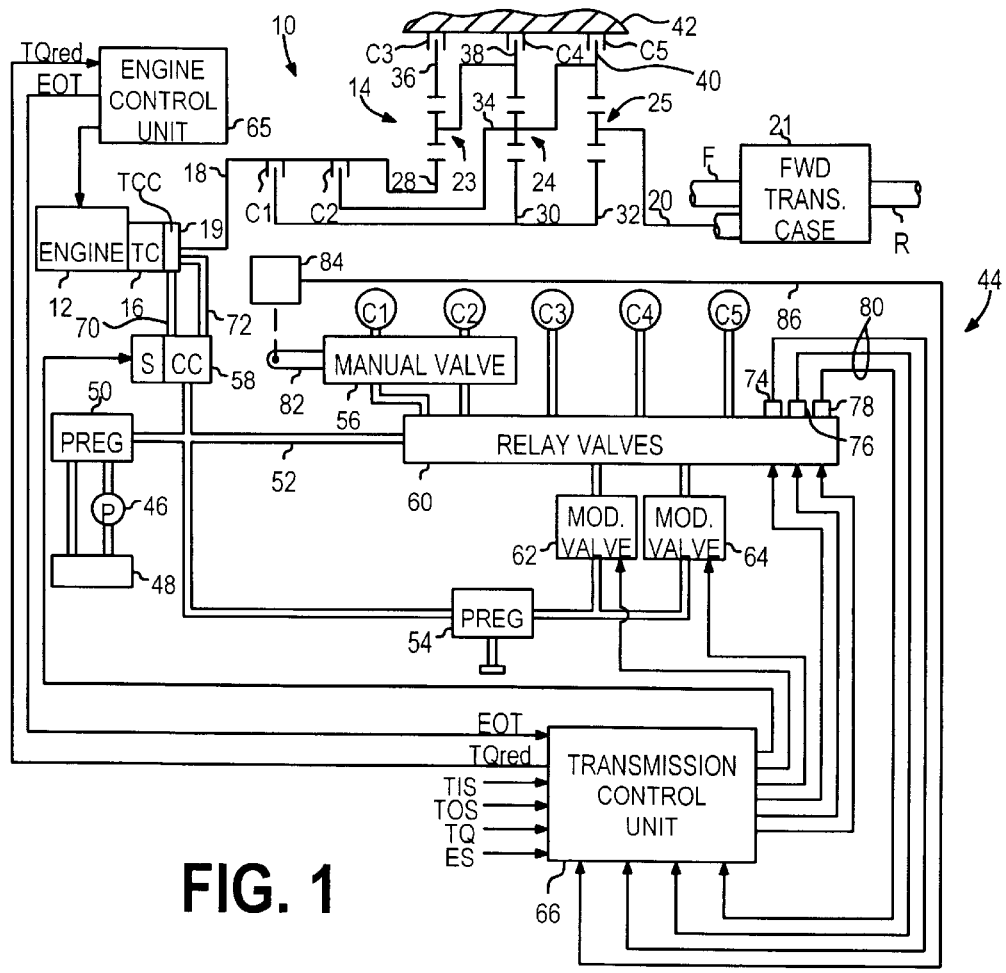
FIG. 1 is a diagram of an automatic transmission and microprocessor-based engine and transmission control units for carrying out the control of this invention.
FIG. 2 is a table indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one speed forward speed ratio to a numerically adjacent speed ratio is generally achieved by disengaging one clutch (referred to as the off-going clutch) while engaging another clutch (referred to as the on-coming clutch). For example the transmission 14 is shifted from first gear to second gear by disengaging clutch C5 while engaging clutch C4.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58, 60, 62, 64.

The electronic portion of the control is primarily embodied in the engine control unit (ECU) 65 and the transmission control unit (TCU) 66, illustrated in FIG. 1 as two separate modules. Both control units 65, 66 are microprocessor-based, and may be conventional in architecture. The ECU 65 controls the operation of engine functions such as fuel, spark timing, and so on depending on the control variables afforded by engine 12, and the TCU 66 controls the solenoid operated fluid control valves 58, 60, 62, 64 based on a number of inputs to achieve a desired transmission speed ratio. The inputs to TCU 66 include signals representing the transmission input speed TIS, engine speed ES, a driver torque request TQ, and the transmission output speed TOS. Sensors for developing such signals may be conventional in nature, and have been omitted for simplicity. Additionally, ECU 65 supplies an engine output torque signal EOT to TCU 66, and TCU 66 supplies a torque reduction command signal TQred to ECU 65.

The control lever 82 of manual valve 56 is coupled to a sensor and display module 84 that produces an diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to TCU 66 on lines 80 based on the respective relay valve positions. The TCU 66, in turn, monitors the various diagnostic signals for the purpose of electrically verifying proper operation of the controlled elements.

The solenoid operated fluid control valves 60, 62, 64 are generally characterized as being either of the on/off or modulated type. In general, modulated valves comprise a conventional pressure regulator valve biased by a variable pilot pressure that is developed by current controlled force motor, and a desired pressure is achieved by controlling the force motor current to a corresponding value. In the case of shifting, for example, TCU 66 determines pressure commands for smoothly engaging the on-coming clutch while smoothly disengaging the off-going clutch, develops corresponding force motor current commands for the respective modulated valves, and then supplies current to the force motors in accordance with the respective current commands. The converter clutch 19 is also controlled by a modulated valve 58, which controls the fluid pressure in lines 70 and 72 for selectively engaging and disengaging the converter clutch 19.

Since modulated valves are significantly more expensive to manufacture and control than simple on/off valves, and since the most commonly performed shifts (i.e., sequential shifts to numerically adjacent speed ratios) involve only one on-coming clutch and one off-going clutch, the control system 44 can be designed to minimize the number of modulated valves. In the illustrated embodiment, for example, the control system 44 includes just two modulated shift control valves 62, 64 combined with a set of on/off (relay) valves 60. The relay valves 60 couple the modulated valves 62, 64 to the on-coming or off-going clutches, and couple the other clutches to either full line pressure or exhaust. Additionally, the design of the relay valves 60 can be simplified for sequential shifting if each of the modulated shift control valves 62, 64 is dedicated to non-sequential clutches. For example, modulated valve 62 may be dedicated to clutches C1, C2 and C4, and modulated valve 64 may be dedicated to clutches C3 and C5. Referring to the table of FIG. 2, the relay valves 60 enable a sequential downshift from $5^{th}$ to $4^{th}$, for example, by coupling modulated valve 62 to on-coming clutch C1 and coupling modulated valve 64 to off-going clutch C3. Similarly, the relay valves 60 enable a sequential downshift from $4^{th}$ to $3^{rd}$ by coupling modulated valve 62 to off-going clutch C2 and coupling modulated valve 64 to on-coming clutch C3. Details of such a valve arrangement are set forth in the aforementioned U.S. Pat. No. 5,601,506 to Long et al., which is incorporated herein by reference.

While the illustrated valve arrangement can significantly simplify the control hardware and reduce manufacturing costs, it essentially rules out skip-shifting—that is, shifting to speed ratio other than a numerically adjacent speed ratio. For example, there is no provision for a skip-downshift from $3^{rd}$ to $1^{st}$ because both on-coming clutch C5 and off-going clutch C3 have to be controlled by the same modulated valve 64. An even more difficult situation arises with so-called double-transition skip shifts in which two clutches are released and two clutches are engaged. This occurs, for example, with a skip-downshift from $5^{th}$ to $2^{nd}$, which requires engagement of clutches C1 and C4 and disengagement of clutches C2 and C3; here on-coming clutches C1 and C4 and off-going clutch C2 all have to be controlled by the same modulated valve 62.

While the above-described problem has previously been handled by performing sequential downshifts instead of a skip-downshift, the present invention provides a method of performing skip-downshifting, whether single transition or double transition. In either event, a commanded skip-downshift is recognized when two or more sequential downshift commands are generated in succession. At such point, TCU 66 aborts the usual downshift control logic, and executes the skip-downshift control logic of the present invention.

In the case of the 3-1 single transition skip-downshift, TCU 66 initially schedules a 3-2 sequential downshift when the driver suddenly depresses the accelerator pedal, and shortly thereafter schedules a 2-1 sequential downshift. The 3-2 downshift involves an off-going control phase during which clutch C3 is gradually released to allow the engine 12 to accelerate toward the synchronous speed of $2^{nd}$ gear, followed by an on-coming control during which clutch C4 is engaged to complete the shift. However, if the 2-1 downshift is scheduled before the on-coming control phase of the 3-2 downshift is underway, TCU 66 recognizes that a skip-downshift is needed, and carries out the skip-downshift control of the present invention. In general, this involves a concurrent control of both engine torque and off-going clutch release. Releasing the off-going clutch C3 effectively shifts the transmission 14 to neutral, and the engine torque command controls the rate at which the transmission input speed TIS increases toward the synchronous speed of the target gear ($1^{st}$). Once the off-going clutch C3 is released, the TCU 66 re-configures the relay valves 60 to couple the modulated valve 64 to the on-coming clutch C5 for the target gear, and then activates the modulated valve 64 to fill and engage the on-coming clutch C5. The time required to re-configure the relay valve 60 and to engage the on-coming clutch C5 can be easily estimated, and the engine torque command is calculated so that the transmission input speed TIS reaches the synchronous speed of the target gear ($1^{st}$) some time after the estimated time has elapsed. The engine torque control also includes an adaptive parameter that is adjusted whenever significant timing errors are observed, so that in subsequent skip-downshifts the desired timing will be more nearly achieved.

Figure 3:
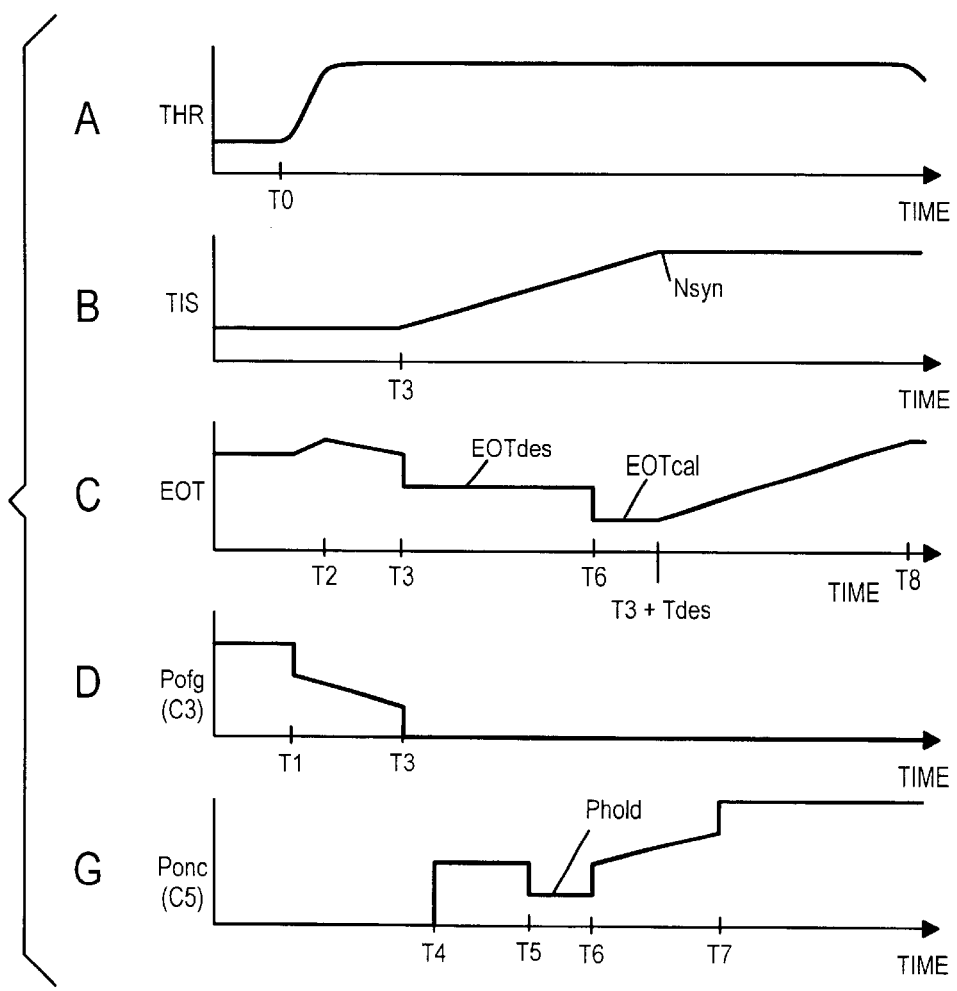
FIG. 3 graphically depicts a single transition skip-downshift according to this invention as carried out by the engine and transmission control units of FIG. 1.

The above-described skip-downshift is graphically depicted in FIG. 3, where Graph A depicts the engine throttle setting THR, Graph B depicts the transmission input speed TIS, Graph C depicts the engine output torque EOT, Graph D depicts the fluid pressure Pofg supplied to off-going clutch C3, and Graph E depicts the fluid pressure Ponc supplied to on-coming clutch C5. The throttle setting THR abruptly increases at time T0, and produces a corresponding increase in engine output torque EOT. The increased throttle setting also causes TCU 66 to command a sequential 3-2 downshift, which is initiated at time T1 by dropping the off-going clutch pressure Pofg to a calibrated value, and then decreasing Pofg at a calibrated ramp rate, as seen in Graph D; this allows the input speed TIS to increase toward the synchronization speed for $2^{nd}$ gear, as seen in Graph B. However, by time T2, the throttle setting THR has increased to the point where TCU 66 commands a 2-1 downshift. This initiates the skip-downshift routine of the present invention, which maintains the progressive reduction of Pofg, as seen in Graph D, and transmits a torque reduction command TQred to ECU 65 for producing a progressive reduction in engine output torque EOT, as seen in Graph C. When the off-going clutch C3 begins to slip at time T3, Pofg is fully released as seen in Graph D, and the relay valve 60 is re-configured to couple modulated valve 64 to on-coming clutch C5 instead of off-going clutch C3. Additionally, the torque reduction command TQred is adjusted to drop the engine output torque EOT to a value EOTdes that will allow the input speed TIS to reach the $1^{st}$ gear synchronization speed Nsyn at desired time Tdes. As explained below, the torque value EOTdes can be computed based on the required change in input speed TIS, the time interval (Tdes) and an estimate of the engine inertia, and an adaptive term is used to trim the control over the course of one or more skip-shifts to help ensure that TIS actually reaches Nsyn at time (T3+Tdes). The desired time Tdes is determined relative to time T3, and must be at least as long as the time required to re-configure relay valve 60 and to at least partially engage the on-coming clutch C5. In the illustration of FIG. 3, the on-coming clutch C5 is filled in preparation for engagement in the interval T4–T5, whereafter the on-coming pressure Ponc is reduced to a hold value Phold that maintains clutch C5 in readiness for engagement. At time T6, a calibrated time before the completion of time Tdes, TQred is adjusted to drop the engine output torque EOT to a calibrated value EOTcal to prevent TIS from overshooting Nsyn, and the on-coming pressure Ponc is increased by a calibrated amount and then ramped upward to begin engagement of on-coming clutch C5. When TIS reaches Nsyn at time Tsyn (which coincides with time Tdes in the illustrated shift), TQred is adjusted to ramp EOT toward a value corresponding to the engine throttle setting THR, which is reached at time T8, after on-coming clutch C5 is fully engaged at time T7.

Figure 4:
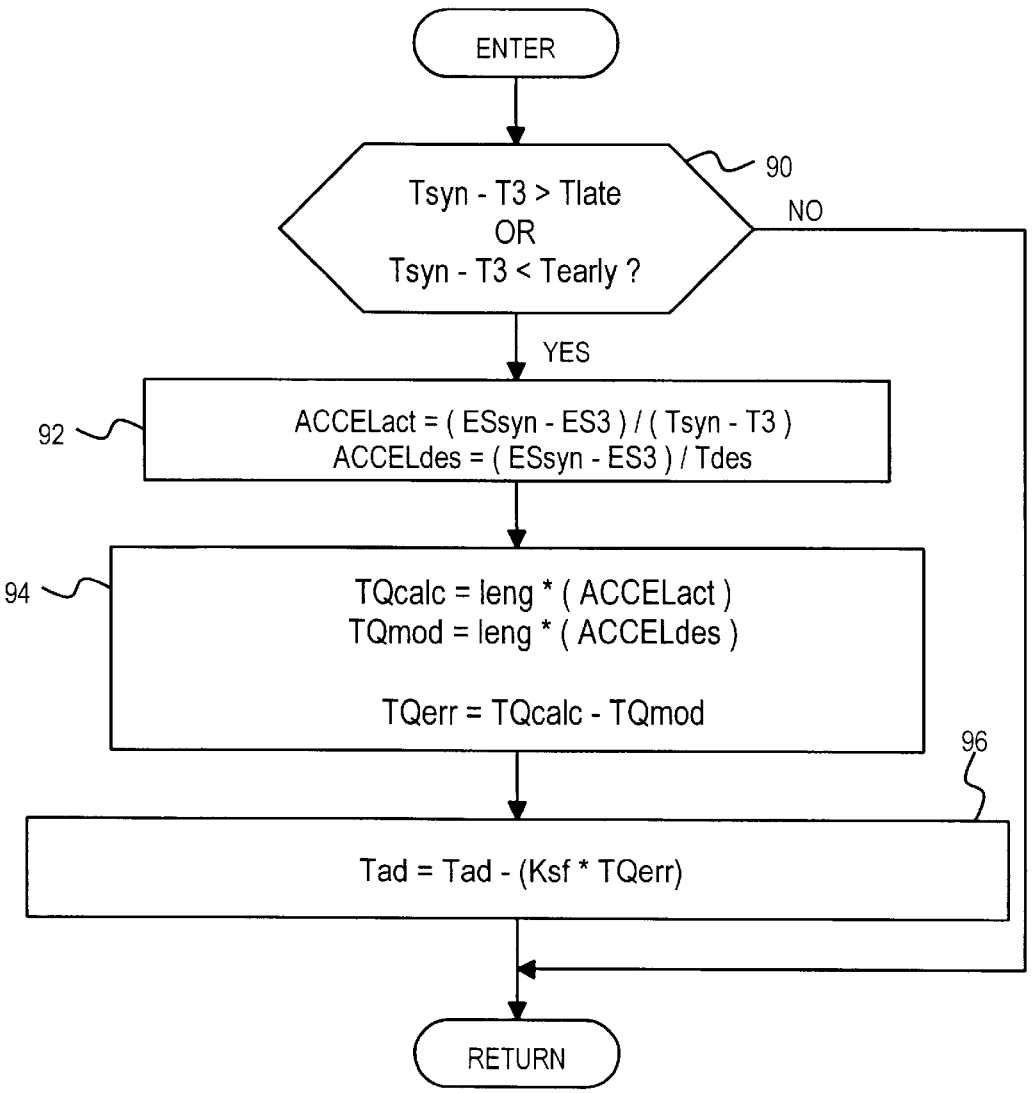
FIG. 4 is a flow diagram depicting a routine executed by the transmission control unit of FIG. 1 for adaptively adjusting a parameter of the shift depicted in FIG. 3.

As indicated above, the torque value EOTdes can be computed at time T3 according to the expression:

$$EOTdes=Ieng*[(Nsyn-TIS)/Tdes]+TQad \qquad (1)$$

where Ieng is an estimate of the engine inertia, (Nsyn–TIS) is the required change in input speed TIS, and Tad is an adaptive term is used to trim the control over the course of one or more skip-shifts to help ensure that TIS actually reaches Nsyn at time Tdes. In general, the adaptive term TQad can be updated upon completion of each such skip-downshift by executing a routine such as depicted in the flow diagram of FIG. 4. Referring to FIG. 4, the block 90 is first executed to determine if the interval (Tsyn–T3) is greater than Tlate or less than Tearly, where Tlate>Tdes and Tearly<Tdes. If block 90 is answered in the affirmative, there is significant control error, and the blocks 92, 94, 96 are executed to update the adaptive term TQad. The block 92 computes the actual and desired engine acceleration values ACCELact, ACCELdes according to the expressions:

$$ACCELact=(ESsyn-ES3)/(Tsyn-T3) \qquad (2)$$

$$ACCELdes=(ESsyn-ES3)/(Tdes) \qquad (3)$$

where ESsyn is the engine speed ES at time Tsyn, and ES3 is the engine speed ES at time T3. The block 94 then determines calculated and modeled engine torque values TQcalc, TQmod corresponding to the actual and desired engine acceleration values ACCELact, ACCELdes, as follows:

$$TQcalc=Ieng*ACCELact \qquad (4)$$

$$TQmod=Ieng*ACCELdes \qquad (5)$$

where Ieng is the engine inertia, as mentioned above. The block 94 then computes an engine torque model error TQerr according to the difference (TQcalc–TQmod), and finally, the block 96 updates the adaptive term Tad as follows:

$$Tad=Tad-(Ksf*TQerr) \qquad (6)$$

where Ksf is a scale factor. In other words, the term TQad is adaptively updated to compensate for engine torque model errors that cause TIS to reach synchronization speed Nsyn too early or too late by converting the engine acceleration error to a torque error, and increasing or decreasing Tad by a specified percentage of such torque error. If TIS reaches Nsyn too early, the torque error TQerr is positive, and Tad is reduced by the product (Ksf*TQerr) so that in subsequent 3-1 skip-downshifts, EOTdes will be correspondingly reduced for lower engine acceleration in the interval (T3–Tsyn). Conversely, if TIS reaches Nsyn too late, the torque error TQerr is negative, and Tad is increased by the product (Ksf*TQerr) so that in subsequent 3-1 skip-downshifts, EOTdes will be correspondingly increased for higher engine acceleration in the interval (T3–Tsyn).

Double transition skip-downshifts are somewhat more complicated, as more clutches are involved. In the 5-2 skip-downshift, for example, clutches C1 and C4 need to be engaged and clutches C2 and C3 need to be disengaged. The difficulty is that on-coming clutches C1 and C4 both have to be controlled by the same modulated valve 62. The off-going clutch C2 is directly exhausted through the relay valves 60 when they are reconfigured to couple on-coming clutch C4 to modulated valve 62.

Figure 5:
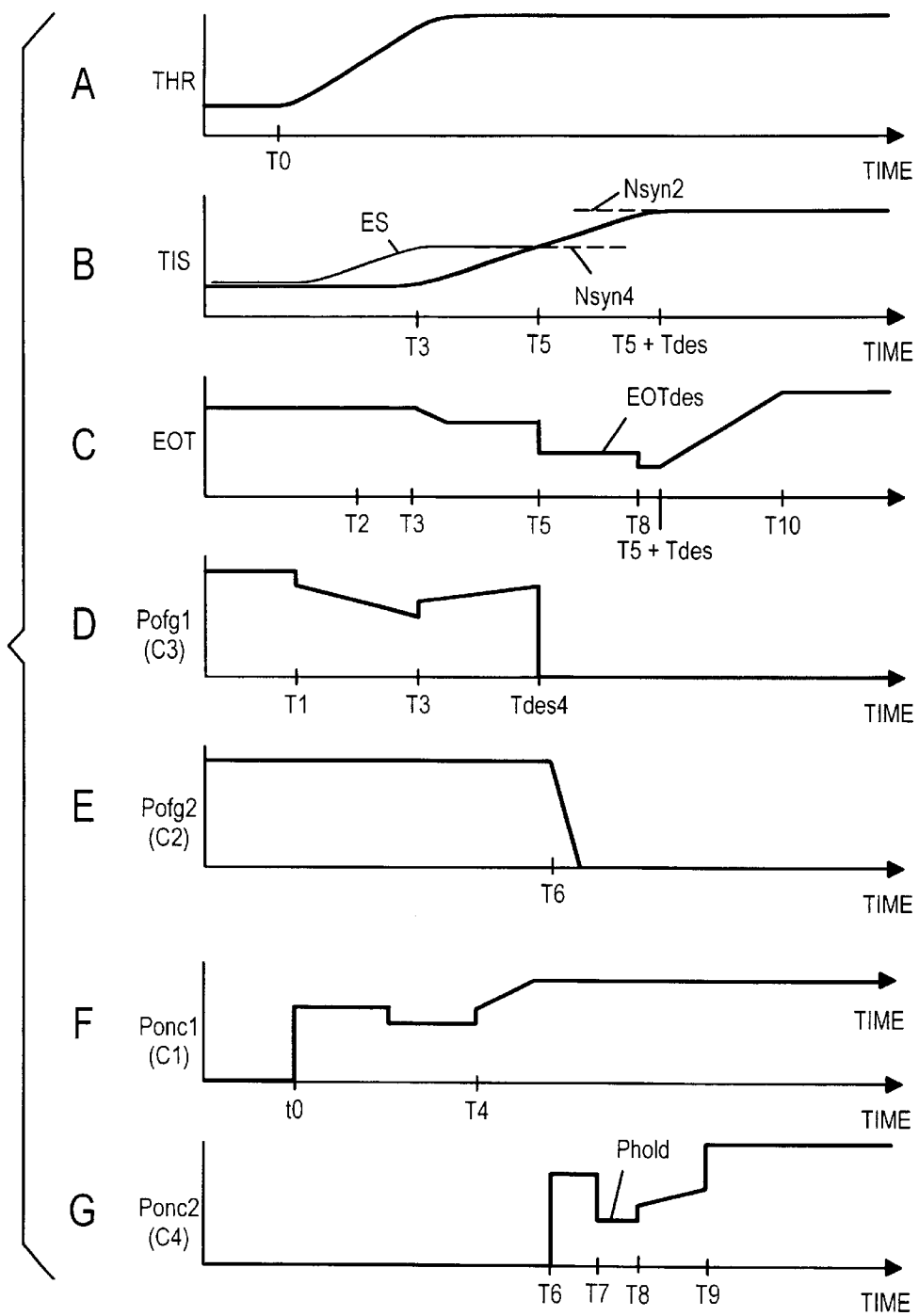
FIG. 5 graphically depicts a double transition skip-downshift according to this invention as carried out by the engine and transmission control units of FIG. 1.

A 5-2 skip-downshift according to this invention is graphically illustrated in FIG. 5, where Graph A depicts the engine throttle setting THR, Graph B depicts the transmission input speed TIS, Graph C depicts the engine output torque EOT, Graph D depicts the fluid pressure Pofg1 supplied to off-going clutch C3, Graph E depicts the fluid pressure Pofg2 supplied to off-going clutch C2, Graph F depicts the fluid pressure Ponc1 supplied to on-coming clutch C1, and Graph G depicts the fluid pressure Ponc2 supplied to on-coming clutch C4. The throttle setting THR abruptly increases at time T0, causing TCU 66 to command a sequential 5-4 downshift, which is initiated at time T1 by dropping and then decreasing the pressure Pofg1 supplied to clutch C3, and initiating the fill period of on-coming clutch C1, as seen in Graphs D and F, respectively. However, by time T2, the throttle setting THR has increased to the point where TCU 66 commands a 4-3 downshift (and then a 3-2 downshift). This initiates the skip-downshift routine of the present invention, which transmits a torque reduction command TQred to ECU 65 for preventing the engine speed ES from exceeding the synchronous speed for $4^{th}$ gear Nsyn4 until the off-going clutch C3 begins to slip. Hence, when engine speed ES approaches Nsyn4 at time T3, the engine output torque EOT is reduced as required to prevent engine speed ES from overshooting Nsyn4. The off-going clutch C3 also begins to slip at time T3, whereupon the pressure Pofg1 is progressively increased to help control the rate of increase in input speed TIS. Shortly thereafter at time T4, Ponc1 is increased to fully engage on-coming clutch C1. When the synchronous speed Nsyn4 for $4^{th}$ gear is reached and on-coming clutch C1 is fully engaged, off-going clutch C3 is fully released as seen in Graph D, and the relay valve 60 is re-configured to couple modulated valve 62 to on-coming clutch C4 and to couple off-going clutch C2 (Pofg2) to exhaust. If the pressure switches 74, 76, 78 indicate that the relay valves 60 have not been reconfigured within a calibrated time, the skip-downshift is aborted, and the 5-4 sequential downshift is completed by releasing off-going clutch C3 and engaging on-coming clutch C1. If the relay valves 60 are re-configured within the calibrated time, the torque reduction command TQred is adjusted to drop the engine output torque EOT to a value EOTdes that will allow the input speed TIS to reach the $2^{nd}$ gear synchronization speed Nsyn2 upon completion of desired time Tdes. The torque value EOTdes is calculated in the same way as in the single transition skip-downshift, only the synchronous speed Nsyn is the synchronous speed for $2^{nd}$ gear, and Tdes is the desired time for achieving the $2^{nd}$ gear synchronous speed. As also explained in relation to the single transition shifts, an adaptive term is used to trim the engine torque control over the course of one or more skip-shifts to help ensure that TIS actually reaches Nsyn2 at time (T5+Tdes). In the interval T6–T7, the on-coming clutch C4 is filled in preparation for engagement, whereafter the on-coming pressure Ponc2 is reduced to a hold value Phold that maintains clutch C4 in readiness for engagement. At time T8, a calibrated time before time (T5+Tdes), TQred is adjusted to drop the engine output torque EOT to a calibrated value EOTcal to prevent TIS from overshooting Nsyn, and the on-coming pressure Ponc2 is increased by a calibrated amount and then ramped upward to begin engagement of on-coming clutch C4. When TIS reaches Nsyn at time (T5+Tdes), TQred is adjusted to ramp EOT toward a value corresponding to the engine throttle setting THR, which is reached at time T10, after on-coming clutch C4 is fully engaged at time T9.

Thus, double transition skip-downshifts are carried out in two stages: a first stage prior to reconfiguration of the relay valves 60 for allowing the input speed to accelerate to the synchronous speed of an intermediate gear, and a second stage following reconfiguration of the relay valves 60 in which the engine torque control of this invention is used to achieve the synchronous speed of the target gear. The transmission is essentially shifted to neutral once the synchronous speed of the intermediate gear is achieved, and the adaptive torque parameter TQad adaptively adjusts the torque control over time as described. However, in certain double transition shifts, it may be desirable to control engine torque in the first stage of the shift so that the synchronous speed of the intermediate gear is achieved at a desired time, instead of holding the engine speed ES at the intermediate synchronous speed.

Thus, the control of the present invention provides a methodology for performing skip-downshifts in a transmission where the control valve configuration is optimized for sequential shifting by allowing the transmission to shift to neutral and adaptively controlling the engine output torque while the transmission is reconfigured to establish the target speed ratio. While described in reference to the illustrated embodiment, it will be understood that various modifications in addition to those mentioned above will occur to those skilled in the art. Thus, it will be understood that control methods incorporating these and other modifications may fall within the scope of this invention, which is defined by the appended claims.

What is claimed is:

1. A method of controlling a power-on downshift of a motor vehicle automatic transmission from a current gear to a target gear, the transmission having an input shaft coupled to receive output torque from an engine, the method comprising the steps of:
   progressively releasing a transmission clutch associated with the current gear to effectively shift the transmission to neutral while limiting the engine output torque;
   computing a value of engine output torque for accelerating the input shaft so that it achieves a synchronous speed of the target gear on completion of a specified time;
   controlling the engine output torque to the computed value when the transmission clutch associated with the current gear begins to slip;
   engaging a transmission clutch associated with the target gear on completion of the specified time; and
   returning the engine output torque to a driver commanded value.

2. The method of claim 1, wherein the computed value of engine output torque is determined according to:

$$I\text{eng}*[(N\text{syn}-TIS)/T\text{des}]$$

where Ieng is an estimate of engine inertia, Nsyn is the synchronous speed of the target gear, TIS is the speed of said input shaft when the transmission clutch associated with the current gear begins to slip, and Tdes is said specified time.

3. The method of claim 1, including the steps of:
   measuring the acceleration of said input shaft during said engine torque control;
   determining an adaptive adjustment for said computed value following completion of the downshift based on the measured acceleration; and
   applying said adaptive adjustment to said computed value in a subsequent downshift.

4. The method of claim 3, wherein the step of determining the adaptive adjustment includes the steps of:
   computing a torque error based on a deviation of the measured acceleration from an acceleration that would cause the input shaft to achieve said synchronous speed at said specified time; and
   updating said adaptive adjustment by a determined percentage of said torque error.

5. The method of claim 3, including the steps of:
   determining a time interval between initial slip of the transmission clutch associated with the current gear and achievement of the synchronous speed of the target gear; and updating said adaptive adjustment if the determined time interval differs from said specified time interval by at least a predetermined amount.

6. The method of claim 1, including the steps of:
reducing the engine output torque by a calibrated amount a predetermined time prior to said specified time; and
at said specified time, progressively returning the engine output torque to the driver commanded value.

7. The method of claim 1, wherein the transmission includes a pressure control valve that is coupled to a selected clutch of said transmission through a relay mechanism, the method including the steps of:
activating the pressure control valve to fully release the transmission clutch associated with the current gear at an initiation of said engine torque control;
controlling the relay mechanism to couple the pressure control valve to the transmission clutch associated with target gear; and
activating the pressure control valve to progressively engage the transmission clutch associated with the target gear.

8. The method of claim 1, including the steps of:
releasing a first clutch associated with the current gear and engaging a first clutch associated with the target gear to establish a gear intermediate the current and target gears during a first stage of the shift; and
releasing a second clutch associated with the current gear and engaging a second clutch associated with the target gear during a second stage of the shift.

9. The method of claim 8, wherein the transmission includes a pressure control valve that is coupled to a selected clutch of said transmission through a relay mechanism, the method including the steps of:
activating the pressure control valve to fully engage the first clutch associated with the current gear during the first stage of the shift;
controlling the relay mechanism to couple the pressure control valve to the second clutch associated with target gear; and
activating the pressure control valve to progressively engage the second clutch associated with the target gear during the second stage of the shift.

10. The method of claim 9, including the step of:
aborting the second stage of the shift and completing a shift to the intermediate gear if the relay mechanism fails to couple the pressure control valve to the second clutch associated with target gear within a predetermined time.

11. The method of claim 8, including the steps of:
controlling the engine output torque so that a speed of said engine is at a synchronous speed of the intermediate gear upon completion of the first stage of the shift;
computing said value of engine output torque so that the input shaft achieves the synchronous speed of the target gear a specified time after completion of the first stage of the shift;
controlling the engine output torque to the computed value during the second stage of the shift;
engaging the second clutch associated with the target gear on completion of the specified time; and
returning the engine output torque to the driver commanded value upon completion of the second stage of the shift.

12. The method of claim 11, wherein the computed value of engine output torque is determined according to:

$$I_{eng}*[(N_{syn}-TIS)/T_{des}]$$

where $I_{eng}$ is an estimate of engine inertia, $N_{syn}$ is the synchronous speed of the target gear, TIS is the speed of said input shaft upon completion of the first stage of the shift, and $T_{des}$ is said specified time.

13. The method of claim 11, including the steps of:
measuring the acceleration of said input shaft during the second stage of said shift;
determining an adaptive adjustment for said computed value following completion of the downshift based on the measured acceleration; and
applying said adaptive adjustment to said computed value in a subsequent downshift.

14. The method of claim 13, wherein the step of determining the adaptive adjustment includes the steps of:
computing a torque error based on a deviation of the measured acceleration from an acceleration that would cause the input shaft to achieve the synchronous speed of said target gear at said specified time; and
updating said adaptive adjustment by a determined percentage of said torque error.

15. The method of claim 13, including the steps of:
determining a time interval between initiation of the second stage of the shift and achievement of the synchronous speed of the target gear; and
updating said adaptive adjustment if the determined time interval differs from said specified time by at least a predetermined amount.

* * * * *